Jan. 18, 1944.          H. SCHUMANN              2,339,296
                GRILLE OF THE IMPINGEMENT TYPE
                Filed Sept. 24, 1940        5 Sheets-Sheet 1

Inventor
Henry Schumann
By J. B. Mothershead
his Attorney

Jan. 18, 1944.   H. SCHUMANN   2,339,296
GRILLE OF THE IMPINGEMENT TYPE
Filed Sept. 24, 1940   5 Sheets-Sheet 2
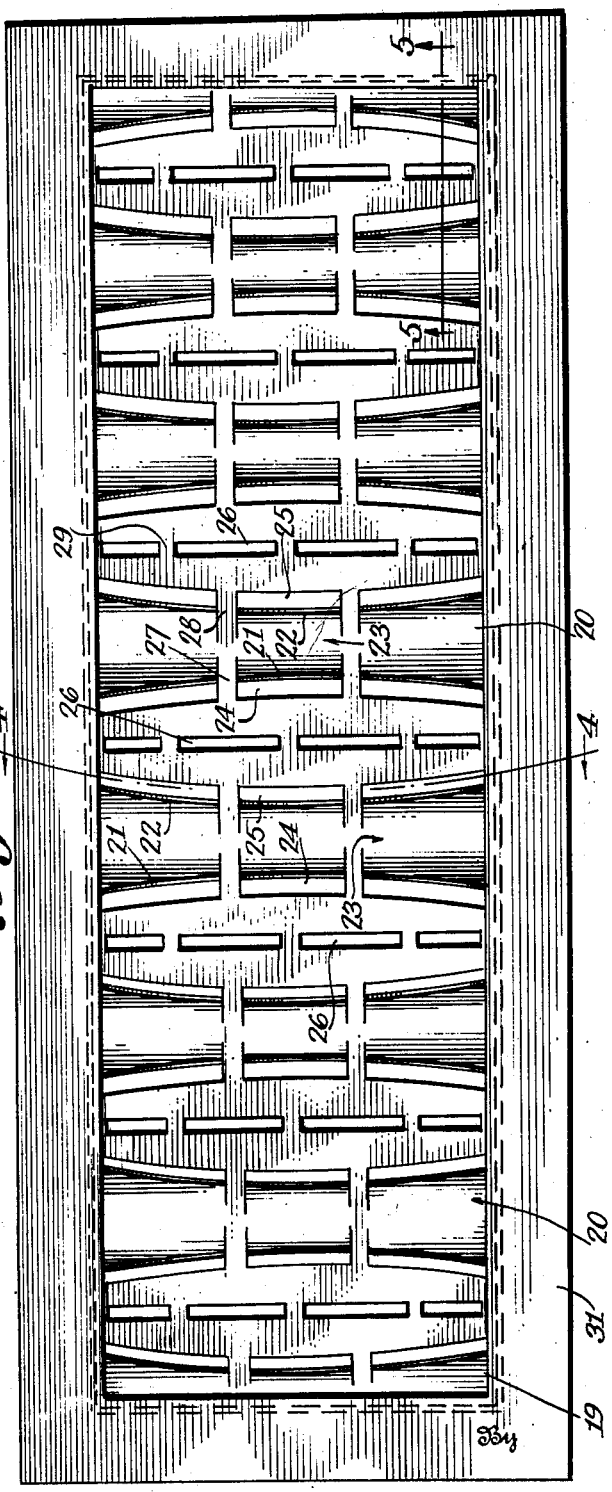
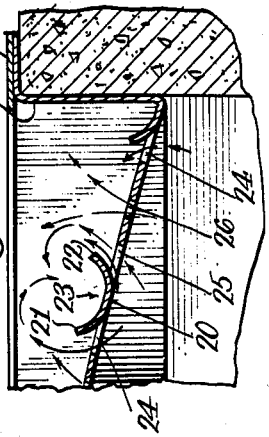
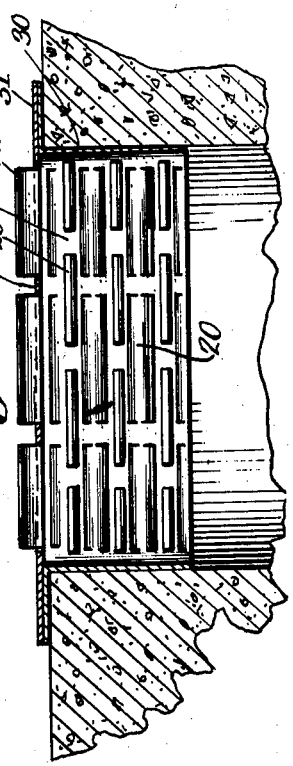
Inventor
Henry Schumann

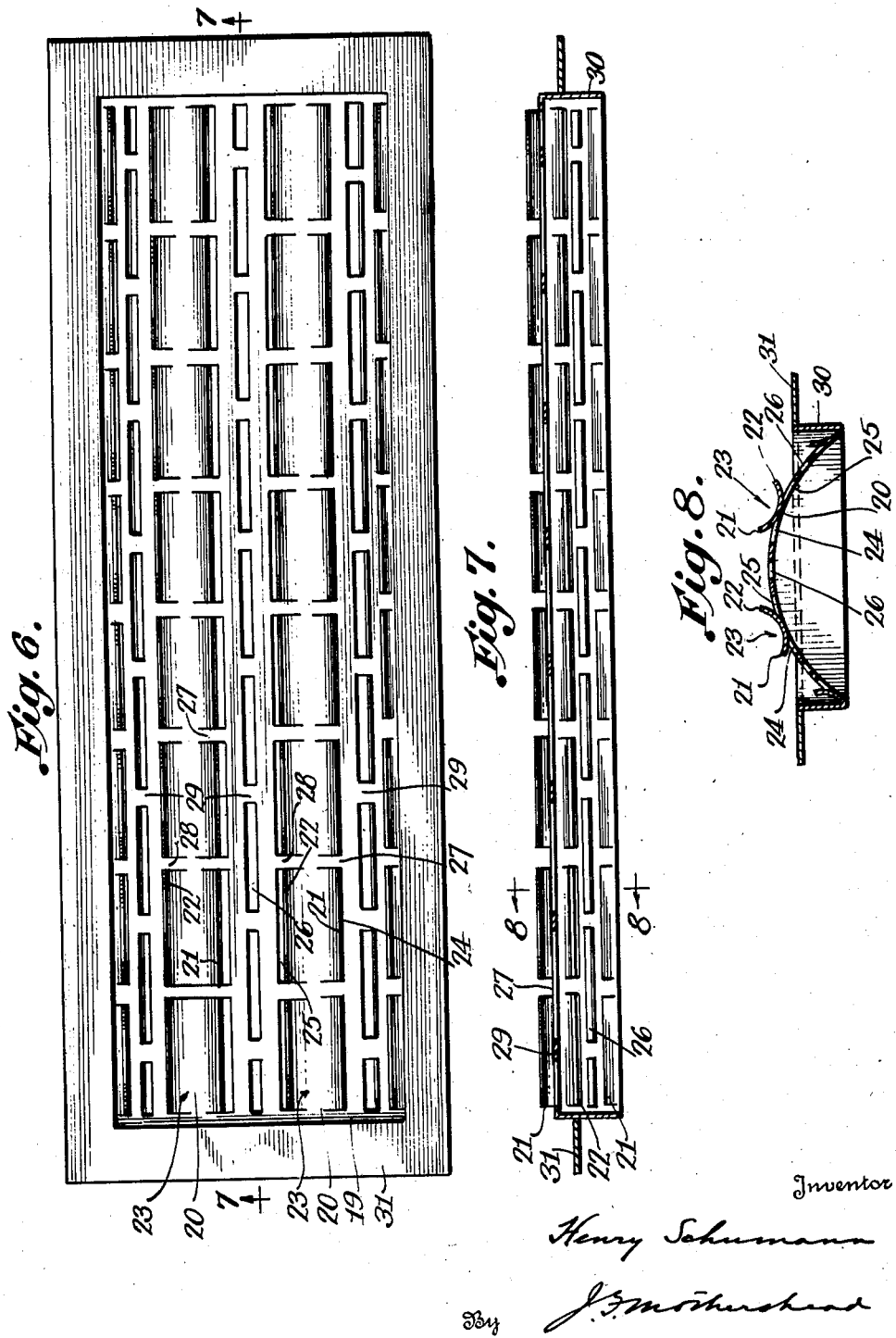

Jan. 18, 1944.   H. SCHUMANN   2,339,296
GRILLE OF THE IMPINGEMENT TYPE
Filed Sept. 24, 1940   5 Sheets-Sheet 4
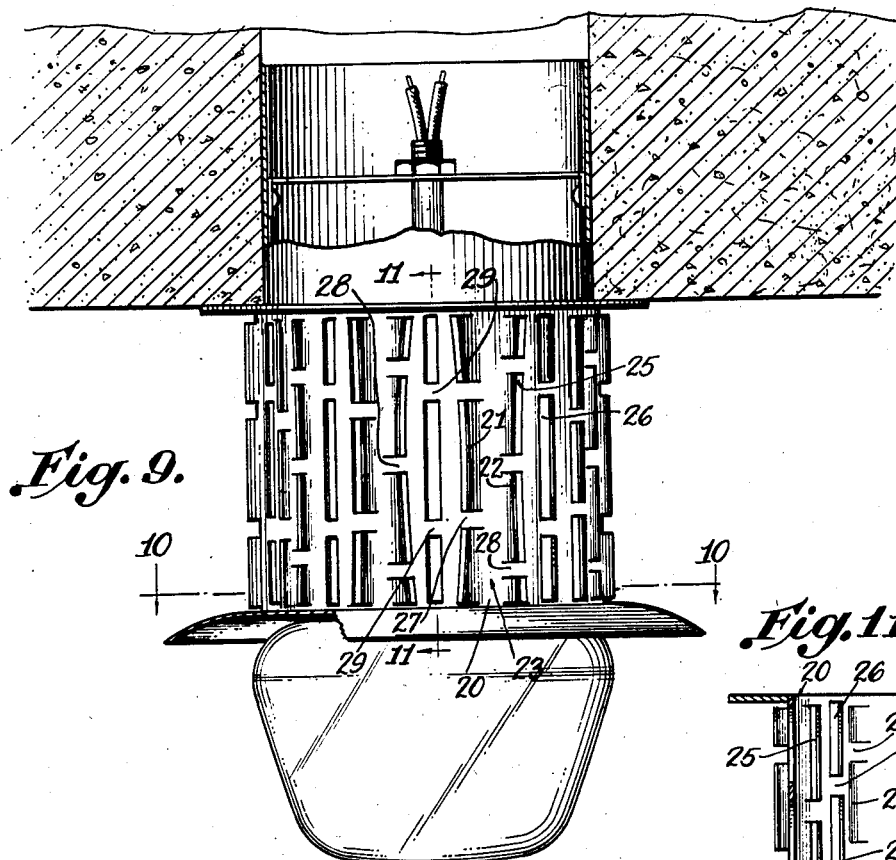
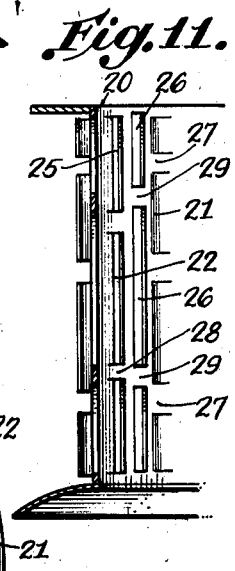
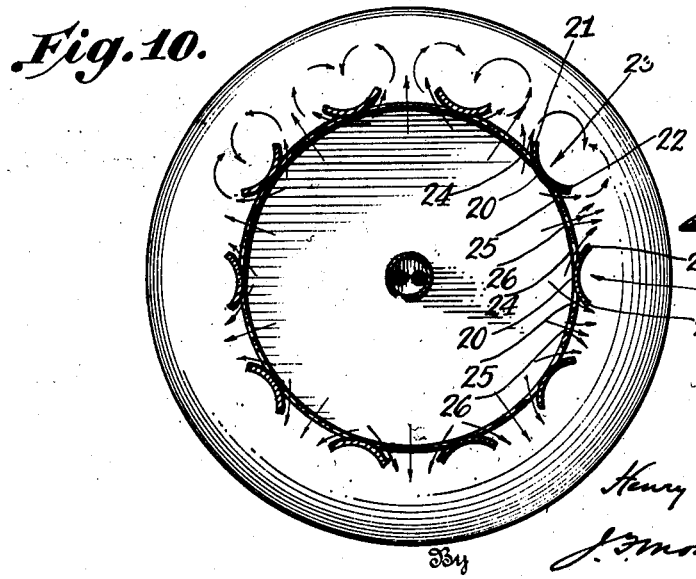

Jan. 18, 1944.  H. SCHUMANN  2,339,296
GRILLE OF THE IMPINGEMENT TYPE
Filed Sept. 24, 1940  5 Sheets-Sheet 5

Inventor
Henry Schumann
By J. B. Mothershead
Attorney

Patented Jan. 18, 1944

2,339,296

UNITED STATES PATENT OFFICE 2,339,296

GRILLE OF THE IMPINGEMENT TYPE

Henry Schumann, Baltimore, Md.

Application September 24, 1940, Serial No. 358,112

3 Claims. (Cl. 98—40)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 St. L. 467).

This invention relates to improvements in grilles for the projection of air, pre-conditioned or otherwise, into confined areas and aims generally to accomplish a complete diffusion of the projected air streams, whereby to eliminate drafts, and the induction of room air into the diffused supply for recirculation.

Aside from the aforesaid aid to human comfort and health, the present invention aims to increase the rapidity with which the air of a served area may be replenished.

In accordance with the present invention, the air of a served area may be replenished in shorter intervals of time, without causing drafts, than by any known types of grilles, and may be supplied at considerably lower temperatures than heretofore, for the maintenance of normal temperatures, due to the rapid recirculation.

With the foregoing and other objects in view, my invention resides in the article, in its construction and arrangement of parts and elements, and in the method of formation described hereinafter and finally pointed out in the appended claims, certain embodiments thereof having the characteristics of my invention, and by which the same may be practiced being illustrated by way of example in the accompanying drawings in which—

Figure 1:
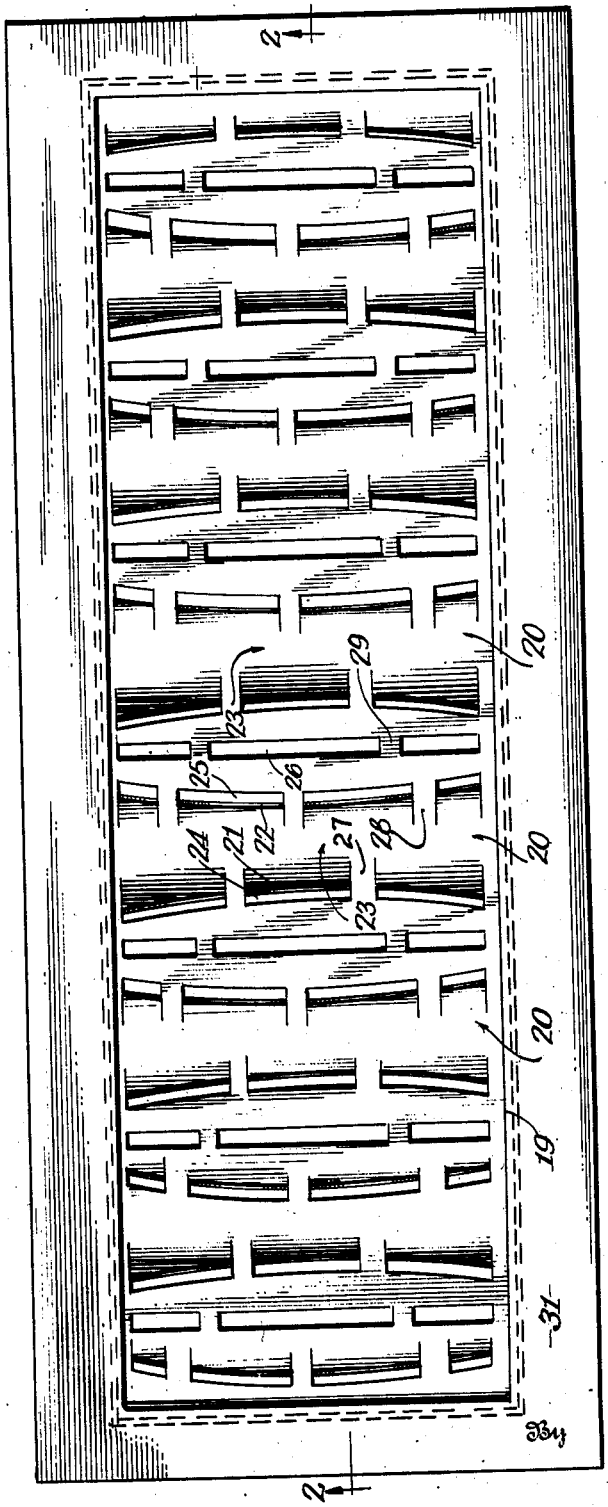
Figure 2:
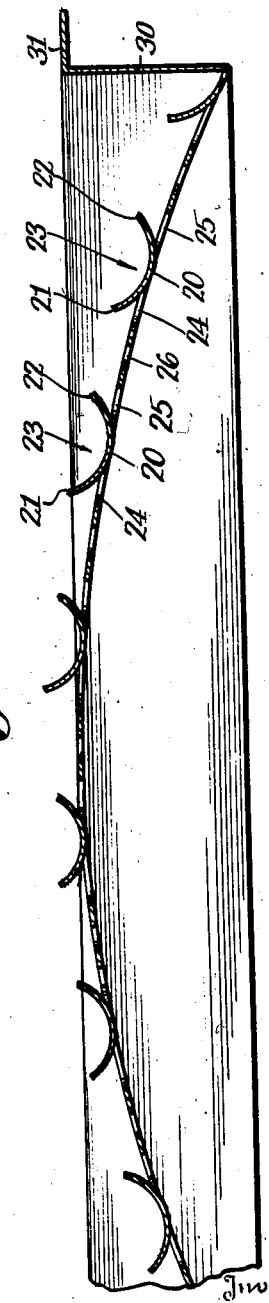
Figures 12, 13:
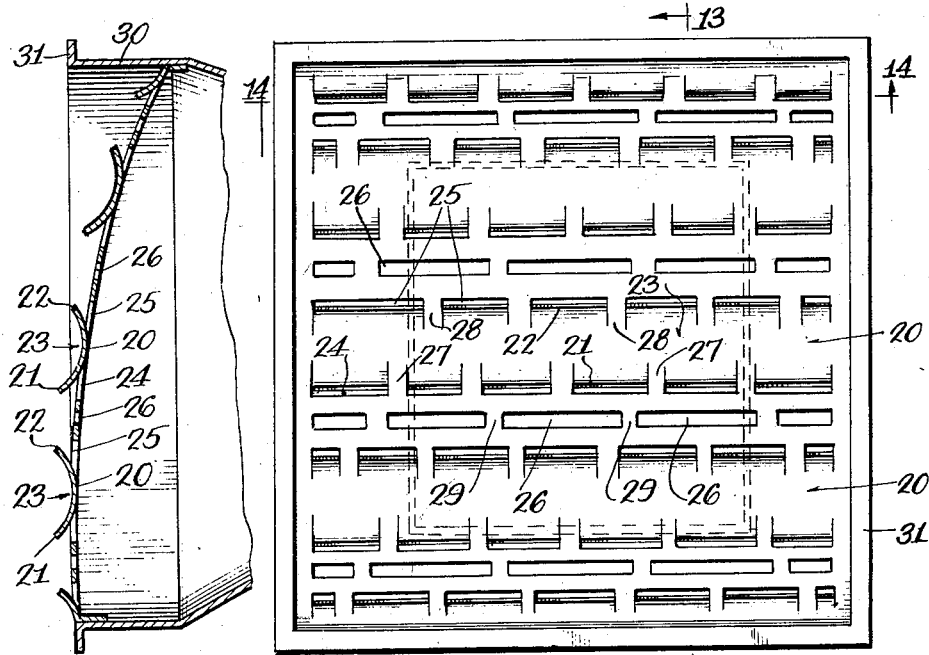

Figure 1 is a plan view of the room-side of an embodiment of my invention;

Figure 2, a fragmentary longitudinal section taken at line 2—2 of Fig. 1;

Figure 3, a plan view comparable with that of Fig. 1 except for its illustration of a modified embodiment;

Figure 4, a cross section taken at line 4—4 of Figure 3;

Figure 5, a fragmentary longitudinal section taken at line 5—5 of Fig. 3;

Figure 6, a plan view comparable with those of Figures 1 and 3, but illustrative of a somewhat modified embodiment of my invention;

Figure 7, a longitudinal section taken at line 7—7 of Fig. 6;

Figure 8, a cross sectional view taken at line 8—8 of Fig. 7;

Figure 9, an elevational view of an adaptation of an embodiment of my invention;

Figure 10, a horizontal section taken at line 10—10 of Fig. 9;

Figure 11, a fragmentary vertical section taken at line 11—11 of Fig. 9;

Figure 12, a plan view of a somewhat modified embodiment of my invention;

Figure 13, a cross sectional view taken at line 13—13 of Fig. 12; and

Figure 14:
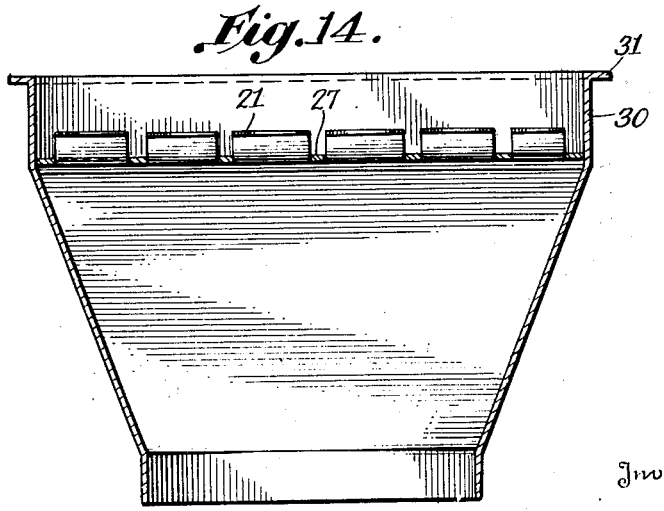

Figure 14, a longitudinal section taken at line 14—14 of Fig. 12.

The embodiments selected for illustration are shown as comprised of, but not necessarily limited to, single sheets of material 19. By cutting, stamping or incising and bending operations the sheets are provided with spaced substantially parallel supporting portions 20 from the opposite edges of which there extend fin-like portions 21 and 22 cut from the sheet. The fin-like portions extending oppositely from each of the spaced supporting portions 20 of the sheet 19 are bent arcuately upward toward each other into reversely disposed louvers which present, with the supporting portion 20, a concavo-convex formation having a concavity 23 along the face thereof and a convex surface on the reverse side of the supporting portion 20 against which the air strikes before passing through the grille.

By the formation thus far described, passageways 24 and 25, through which air streams may flow, are formed by the bending of the fin-like portions 21 and 22 arcuately upward from the plane of the sheet 19. In other words, passageways 24 and 25 are provided along the convex surfaces of the louvers 21 and 22 or along the opposite edges of the concavo-convex formations. Intermediate the passageways 25 and 24, formed by the adjacent louvers 22 and 21 of adjacent concavo-convex formations, there are provided other passageways 26 formed by cutting intermittent sections from the sheet.

Air streams passing through the passageways 26, normal to the plane of the grille, and the converging air streams passing arcuately or tangentially through the passageways 25 and 24, at the opposite sides of the intermediate passageways 26, are thereby directed impingingly upon one another. This action occurs between each row of concavo-convex formations, resulting in the establishment of high pressure areas immediately adjacent to the room-side of the grille, between each of the concavo-convex formations, at the point of air stream impingement, and the establishment of intermediate low pressure areas or vacuums in the concavities 23 of the concavo-convex formations. The impingement of the air streams causes a diffusion of the same whereby draft currents are eliminated and by induction the low pressure areas tend to draw the air from the room into recirculation with the fresh supply.

In order that the grille may be of adequate rigidity, integral and unsevered portions 27 and 28 of the sheet 18 may be retained as reinforcements, as well as for other reasons presently pointed out, between the adjacent ends of the aligned louvers 21 and 22 respectively, or between the passageways 24 aand 25 respectively. Similar reinforcing integral and unsevered portions 29 may be retained as separations in the slot-like passageways 26. The separations between the ends of the aligned louvers 21 and 22 formed by the unsevered reinforcing portions 27 and 28, are preferably disposed at points laterally of intermediate points in the openings 26, as shown in Figures 1, 3, 6, 9 and 12, rather than laterally of the reinforcing portions 29 between the ends of the openings 26. By this arrangement a small portion of the air streams flowing through the openings 26 may flow or be forced into the cavities 23 through the separation between the ends of the louvers to prevent the entrapment of air within the low pressure areas or cavities 23. Likewise the separations between the aligned louvers 21 may be staggered or offset with respect to those, 28, between the ends of the opposite concavo-convex forming louvers 22 as shown in Figures 1, 9 and 12. In this arrangement the small air streams entering the concavities 23 through the separations 27 between the ends of the aligned louvers 21 will strike against the concave surfaces of the aligned louvers 22 at points intermediate the separations 28. Alternately, the air streams entering the concavities 23 through the separations 28 between the ends of the aligned louvers 22 will strike against the concave surfaces of the aligned louvers 21 at points intermediate the separations 27.

The separations 27 and 28 may be arranged diametrically opposite one another, as shown in Figures 3 and 6, rather than in staggered relation as heretofore described in connections with Figures 1, 9 and 12. By the arrangement of Figures 3 and 6, the small air streams entering the directly opposed separations 27 and 28 will impinge at a point within the concavities 23 whereby to prevent the entrapment of air within those low pressure areas.

The separations 27 and 28 should be relatively narrow so as not to permit an air stream therethrough of a size or quantity that will completely destroy the vacuum effect of the concavities 23, but only of such size or quantity as will tend to continually set up a recirculation in the low pressure area of the concavities 23.

It is known that the smaller the number of air-stream passageways of predetermined size for a given cross sectional area of a grille, the greater will be the static or back pressure upon the air supplied to the grille. For this and other reasons, to be described presently, the grille is increased in area considerably over the cross sectional area of the mouth of the duct to which the grille is to be applied by providing a curve in the grille either in a direction longitudinally with the concavo-convex formations, as in Figures 6, 7 and 8 or transversely of the concavo-convex formations, as in Figures 1-5 and 9-14. By this method and construction a greater free grille area is provided for a greater number of air-stream passageways than would otherwise be possible; the static or back pressure upon the air supply is minimized; and furthermore, the diffused air streams, by the curved grille, may be distributed over a greater arc radiating from the curved grille surface.

The concavo-convex formations may be of a uniform width as shown in Figures 6 and 12 whereby the grille may be extended to any desired or unlimited length. The concavo-convex formations may, however, taper or arcuately curve from a comparatively narrow formation in the central portion of the grille to a relatively wide formation at the side walls of the grille. By this arrangement, the relatively small concavities will provide a lesser low pressure area in the central portion of the grille than adjacent the side edges of the grille where the concavities provide greater low pressure areas. This arrangement may be preferred in order to provide a uniformity in the vacuum effect of the grille throughout its entire surface since the increased vacuum effects toward the edges of the grille will blend toward the central portion and when added to the lesser vacuum effect of the central portion will tend to establish uniformity. The vacuum effect may also be somewhat destroyed at the edges of the grille by reason of the deflecting effect of the adjacent side walls of the frame or duct into which the curved portion of the grille extends, which may tend to lessen the vacuum effect along the edges of the grille. The grilles having increasingly curved concavo-convex formations such as shown in Figures 1, 3 and 9 may be extended indefinitely in a direction transversely of the concavo-convex formations but by reason of the increasing curvatures of the concavo-convex formations the width of the grille longitudinally of the concavo-convex formations will be rather limited.

The various grille formations may be utilized in either horizontal or vertical positions and may have a curvature of 360 degrees. An example of a 360 degree curvature is illustrated in Figures 9 through 11 wherein it will be seen that the grille is employed in conjunction with lighting fixtures whereby the air duct may be utilized as a passageway for the conductors to a lamp.

If it is desired to mount the curved grille formations across the mouth of a duct, it is believed advisable that the ends of the grille not extend more than approximately 2½ inches into the duct beyond the plane of the frame 31 or beyond a plane across the mouth of the duct, for the reason that, should the grille extend deeper into the duct, the side walls 30 of the duct, opposite those portions of the grille which extend into the duct, will have a destroying effect upon the normal function of the grille. By experimentation it was found that the deflecting and vacuum effect of the grille will not be destroyed by side walls 30 which extend only 2½ inches along the curved edges of the grille.

The adaptation illustrated in Figures 12, 13 and 14 is somewhat similar to those formations illustrated in 1-8 except for the restricted curvature of the grille. The curvature in the Figure 12 adaptation extends in only one direction from the plane of the wall or frame 31 into which the grille is installed in order that the diffused air streams will be distributed, for example, over restricted areas. Whereas in the formations illustrated in Figures 1-8 the curves of the grille extend in both directions from the plane of its frame 31 or the wall on which the grille is intended to be mounted.

In developing this invention, smoke tests were conducted and as a result thereof it was found that grilles of the formations herein described are extremely effective, as compared with various other types of grilles, to completely destroy the singularity of air streams beyond the surface of the grille and to actually cause the air within the served area to flow toward the surface of the grille and be re-mixed and recirculated continually with the fresh supply. With this result, it was found possible to increase the velocity of the air and thereby hasten the replenishment of the air within the served area. It was also found that the temperature of the supplied air may be considerably less than otherwise required to maintain a pre-determined temperature, within the served area, due to the more rapid recirculation.

The improved grille may also be employed for diffusion of air streams of normal velocity, such as for the diffusion of air flowing into a window. Its usefulness is not limited to inhabited areas but it may be also employed for the diffusion and recirculation of air or other gases for the treatment of food or other articles in restricted or confined areas.

Having described and illustrated embodiments whereby my invention may be practiced what I claim is—

1. An air distributing grille for diffusing and mixing air dispersed therethrough to a restricted area, including a sheet of material having a plurality of cuts therein arranged in pairs to provide a plurality of air openings therethrough, the material of the sheet between said pairs of cuts being formed into concavo-convex formations outwardly extending from the plane of the sheet to deflect the air passing through said air openings in opposite directions, said concavo-convex formations being spaced apart and disposed in rows on the sheet, whereby the air streams passing through the air openings between said formations is deflected toward each other, the sheet being also provided with a plurality of air openings therethrough disposed in rows intermediate of and spaced from said formations, whereby the air passing through the last mentioned air openings impinges the air which is deflected against it from opposite directions by the said formations.

2. An air distributing grille for diffusing and mixing air dispersed therethrough to a restricted area, including a sheet of material having a plurality of cuts therein arranged in pairs to provide a plurality of air openings therethrough, the material of the sheet at said cuts being formed into a plurality of pairs of opposite inclined concavo-convex formations outwardly extending from the plane of the sheet to deflect the air streams which pass through said air openings in opposite directions, said pairs of oppositely inclined concavo-convex formations being arranged in rows on the sheet which are separated by solid portions of the sheet in which portions are provided a plurality of elongated air openings, whereby the air streams passing through the last mentioned air openings impinge the air streams which are deflected against them from opposite directions by the said concavo-convex air deflecting formations.

3. An air distributing grille for diffusing and mixing air dispersed therethrough to a restricted area, including a sheet of material having a plurality of cuts therein to provide a plurality of air openings therethrough, the material of the sheet at said cuts being formed into a plurality of pairs of oppositely inclined air deflecting formations outwardly extending from the plane of the sheet to deflect the air streams passing through said air openings in opposite directions, said pairs of oppositely inclined air deflecting formations being arranged in rows on the sheet which are separated by solid portions of the sheet in which portions are provided a plurality of air openings, whereby the air streams passing through the last mentioned air openings impinge the air streams which are deflecting against them from opposite directions by the said air deflecting formations.

HENRY SCHUMANN.